United States Patent [19]

Lecomte

[11] Patent Number: 4,816,374
[45] Date of Patent: Mar. 28, 1989

[54] METHOD OF MAKING A PLASTIC MATERIAL SENSITIVE TO LASER RADIATION AND ENABLING IT TO BE MARKED BY A LASER, AND ARTICLES OBTAINED THEREBY

[75] Inventor: Gilbert Lecomte, Rives-sur-Fure, France

[73] Assignee: Societe d'Applications Plastiques Rhone-Alpes (SAPRA), France

[21] Appl. No.: 849,776

[22] Filed: Apr. 9, 1986

[30] Foreign Application Priority Data

Apr. 12, 1985 [FR] France ................. 85 05525

[51] Int. Cl.⁴ .................. G03C 1/72; B41M 5/24; C08K 3/00; A01K 11/00
[52] U.S. Cl. ................. 430/270; 430/346; 430/495; 430/945; 430/964; 346/135.1
[58] Field of Search ............ 430/964, 495, 945, 346, 430/374, 270, 906, 18; 346/135.1; 524/409

[56] References Cited

U.S. PATENT DOCUMENTS

| | | | |
|---|---|---|---|
| 3,690,886 | 9/1972 | van den Heuvel et al. | 430/346 |
| 3,996,172 | 12/1976 | Olstowski et al. | 528/77 X |
| 4,096,015 | 6/1978 | Kawamata et al. | 428/901 X |
| 4,206,100 | 6/1980 | Kyo et al. | 524/409 X |
| 4,328,303 | 5/1982 | Ronn et al. | 430/346 |
| 4,451,423 | 5/1984 | Reinehr et al. | 524/409 X |
| 4,578,329 | 3/1986 | Holsappel | 430/945 |

FOREIGN PATENT DOCUMENTS

2546712 12/1984 France .
2107322 4/1983 United Kingdom .

OTHER PUBLICATIONS

Patent Abstracts of Japan, vol. 8, No. 191, (M-322), (1628), Sep. 4, 1984, [JP-A-59 82 185].
Patent Abstracts of Japan, vol. 8, No. 147, (P-285), (1584), Jul. 10, 1984, [JP-A-59 45 642].

*Primary Examiner*—Paul R. Michl
*Assistant Examiner*—Lee C. Wright
*Attorney, Agent, or Firm*—Griffin, Branigan & Butler

[57] ABSTRACT

An opacifier substance is added to a plastic material which is naturally transparent to laser radiation. The opacifier substance is added in powder form as a concentration of 2% to 6% by weight of the plastic material. The opacifier substance is preferably antimony oxide and the resulting plastic material is capable of being permanently marked by a laser beam and is suitable for providing animal ear tags. These tags may be marked with an automatically readable bar code and this code continues to be automatically readable over a period of several years use on the animal.

4 Claims, 1 Drawing Sheet

METHOD OF MAKING A PLASTIC MATERIAL SENSITIVE TO LASER RADIATION AND ENABLING IT TO BE MARKED BY A LASER, AND ARTICLES OBTAINED THEREBY

The invention relates to a method of making any type of plastic material sensitive to laser radiation, and consequently enabling such plastic material to be marked by means of a laser, thereby making an indelible mark which is sufficiently accurate and contrasted to be readable by optical reader devices.

BACKGROUND OF THE INVENTION

Marking plastic materials for various purposes is a general problem which has received various solutions that are satisfactory in special cases. However, as soon as it is necessary for the marking to withstand severe conditions of length of life, in particular in the face of abrasion, few solutions remain acceptable. If further constraints are added concerning the accuracy of marking definition, the retention of such accuracy over a long period of time, and the possibility of reading the marks from a distance and after the plastic material has been exposed to an unfavorable, e.g. abrasive, medium for several years, then none of the known prior solutions is satisfactory.

Accuracy and resistance to being removed are characteristics which are desirable in marks not only from the standpoint of general appearance. Accuracy and resistance become essential for marks constituting bar codes whose sole purpose is to be readable by optical reader devices. Such automatic reading by a device is only possible if the marking conserves adequate contrast over a period of time and it the bars of various pre-defined widths are drawn with sufficient accuracy, for example when bar width remains within 10% of nominal bar width, thereby requiring an absolute accuracy of about 1/100 mm.

Naturally, the marking method must also be rapid and cheap. The most effective prior art method at meeting these conditions is ink jet marking. However, it is not really satisfactory for marking plastic materials because the ink does not adhere adequately. Attempts have been made to remedy this by using a chemically aggressive ink which etches its way into the plastic material. Unfortunately, this method of marking cannot be used for marking bar codes capable of being read by optical reader devices and capable of surviving for a period of several years. This is because the ink migrates into the plastic material and the initial line width accuracy is not retained, thereby giving rise to a high percentage of read errors during automatic reading by reader devices.

It is also known that lasers are capable of being used for highly accurate work, but that most plastic materials are transparent to laser radiation and are thus insensitive to laser action.

Preferred implementations of the present invention provide a method capable of rendering plastic materials which are initially transparent to laser radiation sensitive to said radiation, thereby enabling them to be subsequently marked in an accurate and indelible manner by an operation which is both rapid and cheap.

However, in most circumstances merely making plastic materials sensitive to laser action does not suffice. Many plastic materials have a composition which has been precisely adapted to specific need, after long periods of testing and development. For example, ear tags have been used for a long time to identify animals, in particular cattle. These tags were initially made of metal, which was not very satisfactory because metal is too hard and too rigid and gives rise to injuries to the animal. Completely satisfactory ear tags can now be made out of plastic material, with the tabs being in the form of a plate which is 1.20 mm thick. Such a plate is flexible; it must also be mechanically strong. For cattle, it has become accepted practice for the plastic to have a hardness of 60 on the Shore scale, however, it has been observed that sheep need increased hardness of 74 on the Shore scale, although this is too hard for cattle. In addition, such a plate must not be subject to bacteriological attack. It must also withstand abrasion since a cow may wear it for an average of 8 years. Naturally, the plastic material which makes up the plate must be capable of being marked, and heretofore this has only been possible by depositing ink by a printing or a jet process. The ink marking, whether it is printed or projected, must also withstand wear. There is a French standard (number NF-T-54006) which defines the abrasion tests which the marking must be capable of withstanding. It is desirable for it to withstand 1,000 friction cycles. Ink marking has difficulty in satisfying this condition. However, for the reasons already mentioned above, ink marking is incapable of allowing bar codes to be used for identifying the animals.

The plastic material which satisfies the above-specified requirements and which is preferably adequate in practice is a polyurethane having a protective additive against bacteriological attack added thereto.

This material is completely transparent to laser radiation.

It is clear that making it sensitive to laser radiation must not cause it to lose its other qualities: in other words it is essential to avoid changing any of its properties which ensure that it is well adapted to its intended use.

Preferred implementations of the invention thus provide a method capable of making a plastic material or a plastic material based on composition sensitive to laser radiation without spoiling its other qualities.

SUMMARY OF THE INVENTION

The present invention provides a method of making a plastic material or a composition based on a plastic material sensitive to the action of laser radiation by incorporating a sufficient quantity of opacifier substance to said plastic material to make said material sufficiently opaque for it to be marked by laser radiation, said opacifier substance being selected from the following substances: lead iodide; lead carbonate; lead sulfide; dioxin isocyanate; antimony; related compounds; and mixtures of these substances.

However, account must be taken of the fact that not all of these opacifier substances are neutral relative to the desired color of the plastic material, and in addition they do not all provide colored marking having the same tint.

For example, when marking animal ear tags, regulations in specify different colors for plastic tag plates in different French departments.

Additionally, the invention seeks to provide a method which makes a plastic material sensitive to laser radiation without modifying the intial tint of the plastic material and which provides marking which is black, or at least very dark, thereby providing good contrast with any initial background color.

The enumerated opacifier substances have the advantage of being effective from the point of view of sensitivity to laser radiation when they are incorporated in relatively low concentrations in the plastic material, e.g. from 2% to 6% by weight of the basic plastic material. Although other substances may also have this advantage, the specified substances are readily available and are not too expensive.

The specified substances may be used at higher concentration, but there is no advantage in doing so.

The best marking results concerning fineness of the lines marked, reproducibility from one plate to another, and resistance to rubbing off, have been observed by incorporating the opacifier substance in the form of a powder having a finer particle size than the particles of the plastic material. Preferably, the dimension of the incorporated opacifier substance particles is about 1/20 of the dimension of the particles of plastic material.

The invention also relates to articles made of plastic material which is naturally transparent to laser radiation and which is rendered opaque thereto, at least to a sufficient degree to enable its surface to be marked with a laser beam, by performing the above-defined method of adding specified opacifier substance(s) to the plastic material.

A plastic material made opaque by the method of the invention, e.g. a polurethane plate constituting an animal ear tag, is easily and accurately marked with arabic numerals or a bar code by means of a laser, e.g. a YAG laser having a power of not more than 400 W, said laser emitting a beam with a diameter of 0.1 mm, or less. The part to be marked is placed on a suitable support, which is a poor reflector in order to protect the operator.

BRIEF DESCRIPTION OF THE DRAWING

Embodiments of the invention are described by way of example with reference to the accompanying drawing, in which.

MORE DETAILED DESCRIPTION

Figure 1:
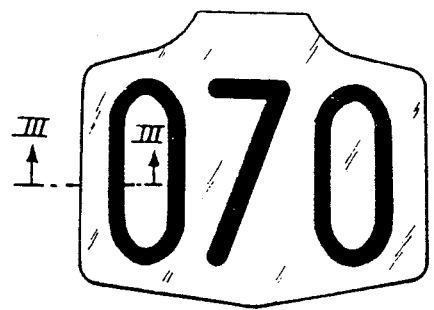
FIG. 1 is a front view of a first ear tag marked with arabic numerals.

The ear tags shown in the drawing were marked using a YAG laser having a wavelength of 1.06 microns.

The mark made by the laser radiation appears in a very dark tone, and is nearly perfectly black. The lines are very fine.

Figure 2:
FIG. 2 is a front view of a second ear tag marked both with arabic numerals and with a bar code.
Figure 3:
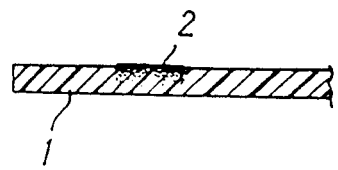
FIG. 3 is a section view through a portion of the tag shown in FIG. 1, on a plane III—III.

The resulting marking is not comparable to engraving. The surface of the plastic material is not dug away; indeed, it appears to be slightly swollen or raised. In FIG. 3, the thickness has been exaggerated in order to show that marking occurs only over a fraction of the plate thickness. For example, a plate 1 having a thickness of 1.2 mm will have marking 2 down to a depth of about 0.3 mm to 0.4 mm. The laser radiation used has carbonized the opacifier substance to said depth within the bulk of the plastic material. A more powerful laser emitted would mark to a greater depth, but that would be pointless, in practice. Thus, as mentioned above, in order to meet French standard NF-T-54006, a cattle ear tag must be capable of withstanding 1,000 abrasion cycles. The inscription on the plate shown in FIGS. 1 and 2 have been subjected to 5,000 cycles, after which they remain legible, both by eye and by means of optical reader devices.

This shows an important advantage of an animal ear tag made in accordance with the method of the invention and marked using a laser. The invention makes it possible to use a bar code mark, thereby enabling animals to be automatically identified while their carcasses are being processed in slaughter houses. Optical readers can be used located at a distance of 30 cm to 50 cm from the carcasses as they are transported through various slaughter house processes by means of a conveyor having hooks from which the carcasses are suspended.

The invention also applied to any animal ear tag made of plastic material in accordance with the method of the invention and marked by means of laser radiation, and in particular it applies to the use of bar codes.

In particular, the presently preferred additive is antimony oxide, since a plastic ear tag containing about 5% antimony oxide is particularly satisfactory, given that adding this concentration of antimony oxide has no undesirable effects on the mechanical characteristics of the basic plastic material.

I claim:

1. A method for marking a plastic material by laser radiation whereby the markings thereon are readable by an optical reader, comprising:
   (1) uniformly distributing in a plastic material a sufficient amount of a laser radiation opacifier substance selected from the group consisting of antimony, antimony oxide and mixtures thereof, such that the resulting plastic is markable by laser radiation but wherein the said amount is not sufficient to substantially degrade the physical properties of the said plastic;
   (2) forming the plastic material into a configuration adaptable to laser radiation;
   (3) exposing the formed plastic material to laser radiation such that the formed plastic is permanently marked by the laser radiation so that the markings are easily readable.

2. A method according to claim 1, wherein the concentration of added opacifier substance lies in the range 2% to 6% by weight of the basic plastic material.

3. A method according to claim 1, wherein the opacifier substance is added in the form of a powder whose particles are finer than the particles of the plastic material.

4. A method according to claim 1, wherein the opacifier substance is added in the form of particles which are about 1/20 of the size of the particles of the plastic material.

* * * * *